(12) United States Patent
Cardona

(10) Patent No.: US 6,328,511 B1
(45) Date of Patent: Dec. 11, 2001

(54) VEHICLE TRANSPORT RESTRAINT ANCHOR

(75) Inventor: Edgardo Cardona, Atchison, KS (US)

(73) Assignee: Kinedyne Corporation, North Branch, NJ (US)

(*) Notice: Subject to any disclaimer, the term of this patent is extended or adjusted under 35 U.S.C. 154(b) by 0 days.

(21) Appl. No.: 09/499,180

(22) Filed: Feb. 7, 2000

(51) Int. Cl.⁷ .................................................. B60P 7/08
(52) U.S. Cl. ........................... 410/12; 410/7; 410/8; 410/10; 410/20
(58) Field of Search .................. 410/7, 8, 10, 11, 410/12, 21, 23, 20, 116, 100, 101, 106; 24/115 K, 265 CD; 248/499

(56) References Cited

U.S. PATENT DOCUMENTS

| | | | |
|---|---|---|---|
| 3,848,889 | * 11/1974 | Sharrow | 410/103 |
| 4,960,353 | * 10/1990 | Thorndyke | 410/20 |
| 4,993,898 | * 2/1991 | Klahold | 410/12 |
| 5,302,063 | 4/1994 | Winsor | 410/30 |
| 5,312,213 | 5/1994 | Winsor | 410/9 |
| 5,586,849 | 12/1996 | Kissel et al. | 410/10 |
| 5,908,274 | * 6/1999 | Silberman | 410/10 |
| 5,941,665 | * 8/1999 | Dahlin | 410/20 |
| 6,139,231 | * 10/2000 | Kissel | 410/20 |

* cited by examiner

Primary Examiner—Stephen T. Gordon
(74) Attorney, Agent, or Firm—Young & Basile, P.C.

(57) ABSTRACT

An anchor for securing an end of a vehicle tie-down member to a wire grid floor of a vehicle transporter distributes the tension load from the tiedown member over a plurality of the wires making up the grid. The anchor has a base plate with six integrally formed grid engagement members arranged in three pairs. A fitting is disposed on the upper surface of the base plate for connection with the end of the tie-down member and is rotatable about a vertical axis with respect to the base place. The anchor is placed on the top of the wire grid floor such that the grid engagement members pass through six adjacent openings in the grid and the distal ends of the members project generally in the direction in which the tie-down member is to extend when attached to the vehicle, and the tie-down member is tightened to urge the grid engagement members tightly into engagement with the wires of the grid. Each grid engagement member engages the grid at a different point so that the tension load from the tie-down member is spread out over the grid.

12 Claims, 3 Drawing Sheets

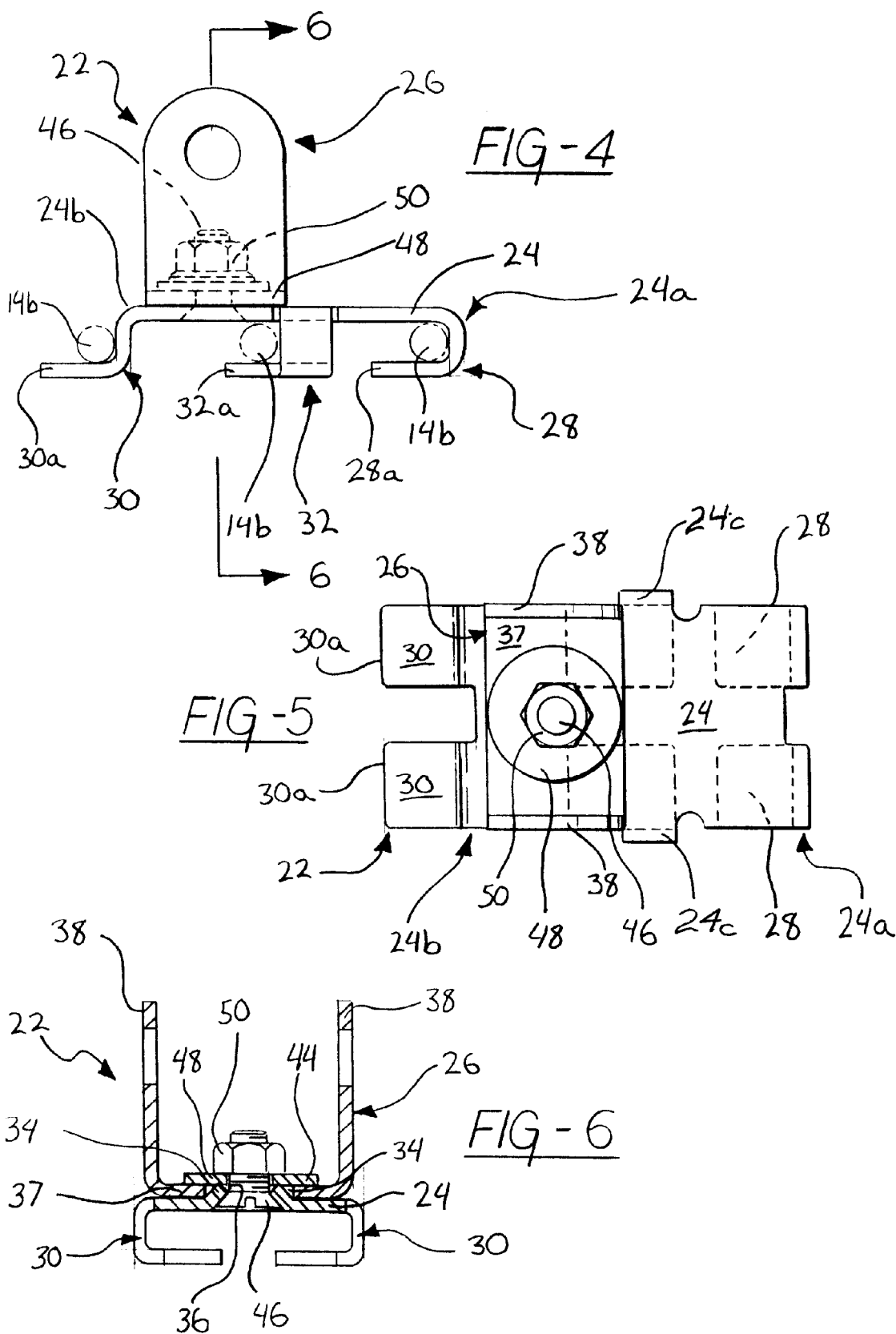

VEHICLE TRANSPORT RESTRAINT ANCHOR

FIELD OF INVENTION

This invention relates to restraint systems for securing automotive vehicles during shipment on flat-bed railway cars, trailers, or other similar transport vehicle. More particularly, this invention relates to an anchor for securing a tie-down member such as a strap or cable to a wire mesh grid floor of a transport vehicle.

BACKGROUND OF THE INVENTION

Various anchoring or restraint methods are known for securing automotive vehicles to a flat-bed transport vehicle to prevent shifting of the automotive vehicles during shipment to a delivery location. In one such method, a plurality of flexible, inextensible restraint members such as chains or straps are used to tie the vehicle downwardly to the floor of the transport vehicle. One end of each tie-down member is attached to the vehicle frame or to one of the vehicle's tires, and the other end is fastened to the floor of the transport vehicle. The tie-down members are then tightened, for example by means of hand-operated winch mechanisms on each of the members.

The tie-down member is usually secured to the floor of the transporter by means of a hook attached to the end of the member. Some transporters have floors made of perforated metal decking, in which case the hooks are passed through a hole at the correct location. Other transporters have one or more rails extending in a longitudinal direction, the rails having holes or rungs with which the hooks may be engaged.

Some railway cars for transporting vehicles have multiple levels to increase the number of vehicles that may be carried on a single car. In order to decrease the weight of the railway car, the floors of the upper level are sometimes made of a welded wire mesh or grid. The grid is typically made up of approximately ⅜" diameter steel wires spaced from one another on 1½" centers. In the past, when it has been necessary to secure the hook of a tie-down member to such a grid floor, the hook has simply been passed around one of the wires. Accordingly, the hook transfers the tension force of the tie-down member hook as a point load on only one wire. Such a highly concentrated loading may tend to bend the wire and/or weaken the weld or welds between wires adjacent the point of attachment.

SUMMARY OF THE INVENTION

It is an objective of the present invention to provide a restraint anchor for securing an end of a vehicle tie-down member to a wire grid floor of a vehicle transporter. It is a further object of this invention to provide a restraint anchor which distributes the tension load from the tie-down member over a plurality of the wires making up the grid.

In caring out the invention in the illustrative embodiment thereof, the anchor comprises a base plate having a lower surface for contacting the wire grid floor and an opposite upper surface, a fitting disposed on the upper surface of the base plate for connection with the end of the tie-down member, and at least two grid engagement members formed integrally with the base plate and projecting downwardly therefrom to engage the wire grid. Each grid engagement member engages the grid at a different point so that the tension load from the tie-down member is spread out over the grid.

According to a preferred embodiment to the invention, the anchor has six grid engagement members arranged in three pairs. The first pair of grid engagement members are integral with the first end of the base plate and have distal ends projecting toward the opposite end of the plate. The second pair of grid engagement members are integral with the second end of the plate and project beyond the second end of the plate. The third pair of grid engagement members are integral with opposite lateral edges of the base and extend toward the second end thereof at a location half way between the first and second pair of grid engagement members. The grid engagement members making up each of the first, second, and third pairs are spaced apart from one another by an amount greater that the diameter of the wires making up the grid with which the anchor is to be used.

The anchor is placed on the top of the wire grid floor such that the grid engagement members pass through six adjacent openings in the grid and the distal ends of the members project generally in the direction in which the tie-down member is to extend when attached to the vehicle. The grid engagement members of up each pair fit on opposite sides of the longitudinally extending wire running down the centerline of the baseplate. The anchor is then slid toward the tie-down member so that the ends of the grid engagement members hook beneath three adjacent, laterally extending wires of the floor. The tie-down member is then attached to the fitting on the upper surface of the base plate, and as the tie-down member is tightened the anchor is pulled securely into engagement with the floor.

According to another feature of the invention, the fitting of the anchor is rotatable about a vertical axis with respect to the base place. This allows the fitting to rotate to the proper orientation in alignment with the tie-down member when the anchor so that the anchor may be placed at positions other than directly in front of or behind the point of attachment to the vehicle, and may be used on either side of the vehicle.

BRIEF DESCRIPTION OF THE DRAWINGS

FIG. 4 is a side elevation view of the anchor of FIG. 2;

FIG. 5 is a top view of the anchor; and

FIG. 6 is a cross section view taken along line 6—6 of FIG. 4.

DETAILED DESCRIPTION OF THE PREFERRED EMBODIMENT

Figure 1:
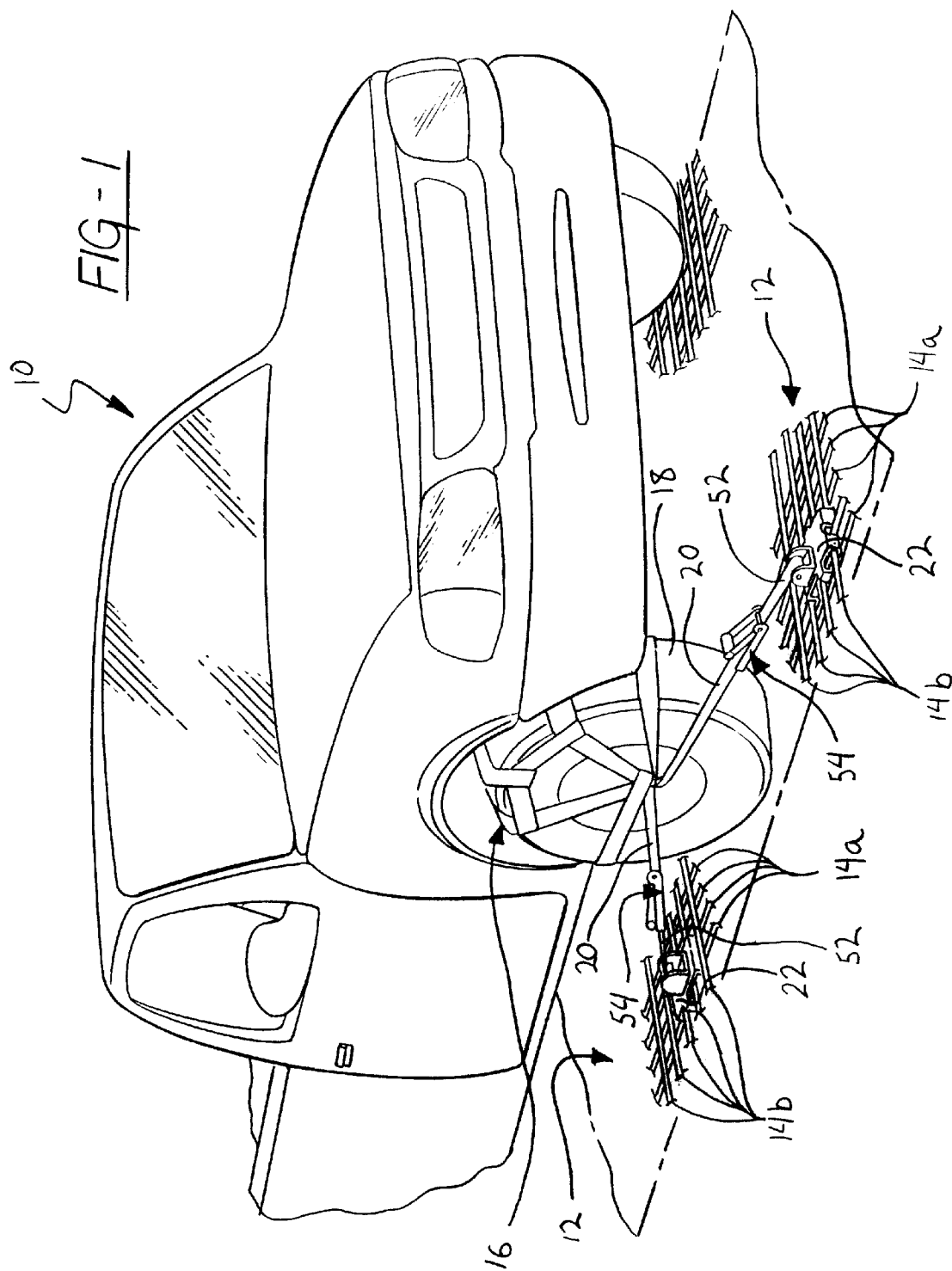
FIG. 1 is a perspective environmental view of a pair of anchors according to the present invention used to secure a vehicle with respect to a wire grid floor.

Referring to FIG. 1, an automotive vehicle 10 is shown positioned on a wire grid floor 12 such as that found on the upper deck of a vehicle transporter such as a railroad car or a semi-trailer. The wire grid floor 12 is fabricated from longitudinal and lateral steel wires 14a,14b approximately ⅜" in diameter which are arranged on approximately 1½" center-to-center spacing and welded together at their points of intersection. The given grid dimensions are currently an industry standard, however the invention anchor may be manufactured in any size necessary for use with a grid of different size.

A tire harness 16 such as that disclosed in U.S. Pat. No. 5,586,849 is wrapped around a tire 18 of the vehicle 10 and tie-down members 20 extend forwardly and rearwardly with respect to the vehicle 10 and connect with anchors 22 according to the present invention. The anchors 22 are engaged with the wire grid floor 12 as described hereinbelow to prevent motion of the vehicle 10 relative to the floor 12.

While the invention restraint anchor 22 is shown used with a tire harness 16 and tie-down members 20 made of woven, synthetic webbing, it may also be used with any other type of tie-down member attached to any part of the vehicle 10. For example, a chain attached to a hole, eyelet or fitting on the vehicle frame may be secured to the grid floor 12 using the inventive anchor 22.

Referring now to FIGS. 2–5, the anchor 22 is shown to generally comprise a base plate 24 and a fitting 26 rotatably secured to the base plate 24. Both the base plate 24 and fitting 26 are preferably formed from 1/8" thick steel plate and may be coated with zinc to resist corrosion.

A first pair of spaced apart grid engagement members 28 are formed integrally with a first end 24a of the base plate 24 and are bent into hooks projecting downwardly and having distal ends 28a extending toward an opposite second end 24b of the plate.

A second pair of grid engagement members 30 are formed integrally with the second end 24b of the base plate 24 and are bent into L-shapes extending downwardly and having distal ends 30a projecting beyond the second end of the base plate 24.

A third pair of grid engagement members 32 are formed integrally with respective opposite lateral edges 24c of the base plate 24 and are bent downwardly and inwardly with respect to the base plate 24 to wrap around beneath the lower surface thereof. Distal ends 32a of the third grid engagement members extend toward the second end of the base plate 24.

The two grid engagement members making up each of the pairs are separated laterally from one another by a distance greater than the diameter of the longitudinally extending wires 14a of the grid. The distal portions 28a,30a,32a of the members parallel with the base plate 24 are spaced from the lower surface thereof by a distance greater than the diameter of the lateral wires 14b of the grid.

A frustrum-shaped projection 34 is formed on the upper surface of the base plate 24 and a hole 36 passes through the center of the projection 34 (see FIG. 6).

Figure 2:
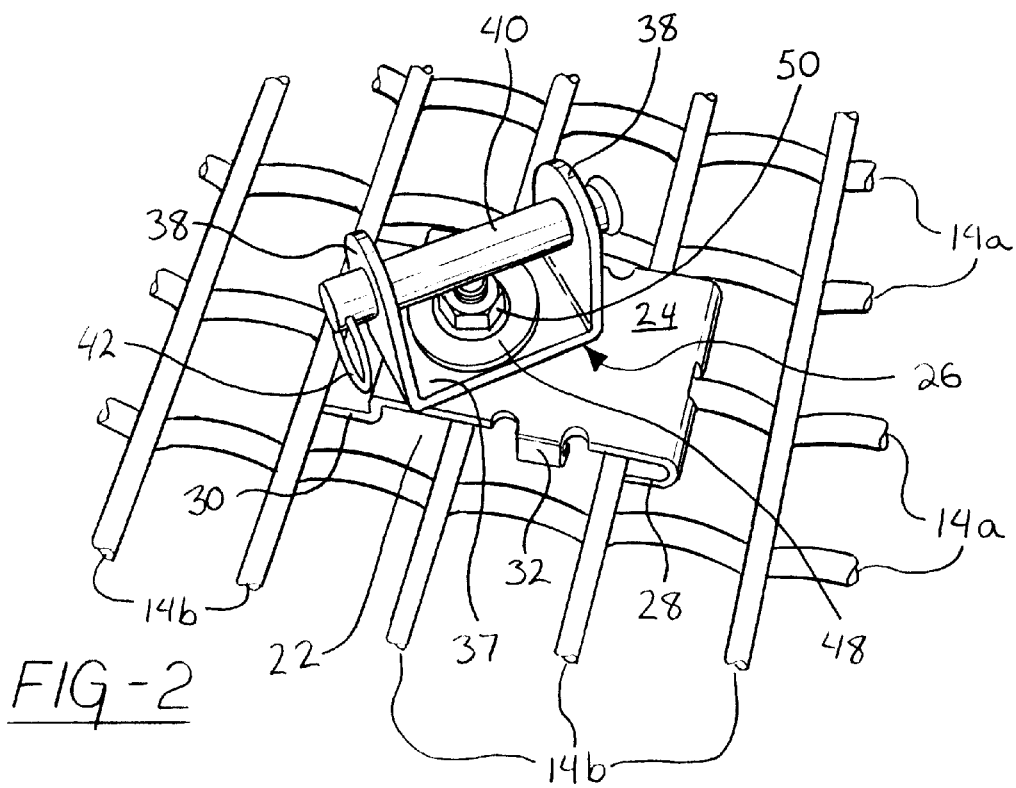
FIG. 2 is a perspective view from above showing an anchor according to the invention partially engaged with a wire grid.

In the preferred embodiment, the fitting 26 comprises a U-shaped clevis having a center portion 37 and two parallel ears 38 projecting substantially perpendicular to the center portion and a removable pin 40 extending between the ears 38 and secured with a snap ring 42 or the like (see FIG. 2). A hole 44 is formed through the central portion 27 of the fitting 26 and is larger in diameter than the projection 34. Accordingly, when the center portion 37 lies on top of the base plate 24 the projection 34 extends through the hole 44 in the center portion and the upper end of the projection 34 is slightly above the upper surface of the center portion 37. A bolt 46 is inserted through the hole 36 in the base plate 24 from below and a large washer 48 and nut 50 are placed over the bolt and tightened down. The washer 48 bears against the top of the projection 34, and there is sufficient clearance between the lower surface of the washer and the upper surface of the center portion 37 for the fitting 26 to rotate freely with respect to the base plate 24.

Figure 3:
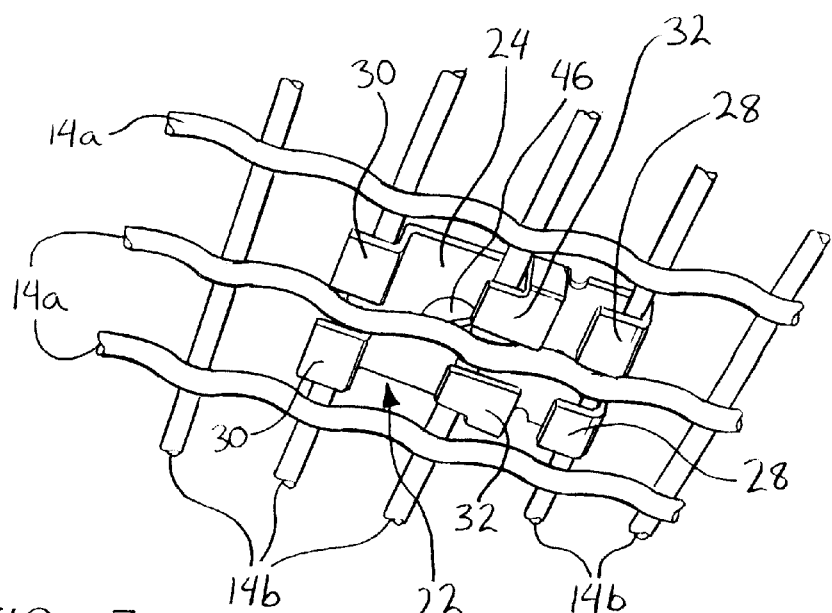
FIG. 3 is a perspective view from below showing the anchor of FIG. 2 fully engaged with the wire grid.

The anchor 22 is placed on the grid floor 12 at the spot where it is desired to secure the fie-down member 20 and with the grid engagement members 28,30,32 extending through adjacent holes in the grid and the distal ends 28a,30a,32a projecting toward the point where the tie-down member 20 is attached to the vehicle. The anchor 22 is then slid with respect to the floor 12 so that the distal ends of the grid engagement members 28a,30a,32a pass beneath the respective lateral wires 14b of the grid. As best seen in FIG. 3, each pair of grid engagement members 28,30,32 engages a different lateral wire 14b, the members of each pair bracketing the longitudinal wire 14a which passes down the center of the base plate 24.

For a tire harness-type restraint such as is shown in FIG. 1, two or more anchors 22 are generally used, at least one anchor positioned forwardly of the tire 18 and one rearwardly of the tire. A hook 52 at the end of the tie-down member 20 is engaged with the pin 40 of the fitting 26. As the tie-down member 20 is tightened using a hand-operated winch mechanism 54 or similar device, the tension in the tie-down member pulls the anchor 22 toward the point of attachment to the vehicle 10 so that the grid engagement members 28,30,32 are urged into full engagement with the grid. The tension loading in the tie-down member 20 is distributed over six points on three adjacent lateral wires 14b of the grid, thus reducing the stress levels in the grid as compared with the prior art wherein a hook at the end of the tie-down member engages only a single point on one of the lateral wires. The fitting 26 is able to rotate with respect to the base plate 24 so that the fie-down member 20 may line up with the direction of the applied load no matter where the anchor 22 is positioned relative to the point of attachment of the tie-down member to the vehicle 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A restraint anchor for securing an end of a vehicle tie-down member relative to a wire grid floor of a vehicle transporter, the anchor comprising:

a base plate having a lower surface for contacting the wire grid floor and an opposite upper surface;

at least one grid engagement member extending downwardly from said lower surface of the base plate;

a fitting disposed on said upper surface of the base plate and having means for connection to the end of the tie-down member comprising first and second spaced apart ears and a pin extending between the ears; and a first and a second grid engagement member spaced from one another along a longitudinal axis of the base plate by a distance generally equal to an integer multiple of a center spacing between adjacent wires of the grid.

2. A restraint anchor for securing an end of a vehicle tie-down member relative to a wire grid floor of a vehicle transporter, the anchor comprising:

a base plate having a lower surface for contacting the wire grid floor and an opposite upper surface;

at least one grid engagement member extending downwardly from said lower surface of the base plate;

a fitting disposed on said upper surface of the base plate and having means for connection to the end of the tie-down member comprising first and second spaced apart ears and a pin extending between the ears;

a first and a second grid engagement member spaced from one another along a longitudinal axis of the base plate by a distance generally equal to an integer multiple of a center spacing between adjacent wires of the grid; and a third grid engagement member and a fourth grid engagement member projecting downwardly from opposite lateral edges of the base plate.

3. A restraint anchor for securing an end of a vehicle tie-down member relative to a wire grid floor of a vehicle transporter, the anchor comprising:

a base plate having a lower surface for contacting the wire grid floor and an opposite upper surface;

at least one grid engagement member extending downwardly from said lower surface of the base plate;

a fitting disposed on said upper surface of the base plate and having means for connection to the end of the tie-down member;

a first and second grid engagement member spaced from one another along a longitudinal axis of the base plate by a distance generally equal to an integer multiple of a center spacing between adjacent wires of the grid;

the first grid engagement member being integral with a first end of the base plate and has a distal end projecting beyond the first end of the base plate, and the second grid engagement member being integral with a second end of the base plate and has a distal end projecting toward the first end of the base plate;

further comprising a third grid engagement member and a fourth grid engagement member projecting downwardly from opposite lateral edges of the base plate, wherein the distance along the longitudinal axis between the first and second grid engagement members is generally equal to twice the center spacing between adjacent wires of the grid, and the third and fourth grid engagement members are disposed at a longitudinal location half way between said first and second ends of the base plate.

4. A restraint anchor for securing an end of a vehicle tie-down member relative to a wire grid floor of a vehicle transporter, the anchor comprising:

a base plate having a lower surface for contacting the wire grid floor and an opposite upper surface;

at least one grid engagement member extending downwardly from said lower surface of the base plate;

a fitting disposed on said upper surface of the base plate and having means for connection to the end of the tie-down member; and wherein the fitting is rotatable about an axis generally perpendicular to the base plate.

5. A restraint anchor for securing an end of a vehicle tie-down member relative to a wire grid floor of a vehicle transporter, the anchor comprising:

a base plate having first and second longitudinal ends, a lower surface for contacting the wire grid floor and an opposite upper surface;

a first grid engagement member integral with the first end of the base plate and projecting downwardly from the base plate and beyond the first end of the base plate;

a second grid engagement member integral with the second end of the base plate projecting downwardly from the base plate and toward the first end of the base plate, the first and second members spaced from one another along a longitudinal axis of the base plate by a distance generally equal to an integer multiple of a center spacing between adjacent longitudinally extending wires of the wire grid floor; and a fitting disposed on the upper surface of the base plate for connection to the end of the tie-down member.

6. The anchor according to claim 5 further comprising a third grid engagement member and a fourth grid engagement member integral with opposite lateral edges of the base plate and projecting downwardly and toward the first end of the base plate.

7. The anchor according to claim 6, wherein the distance along the longitudinal axis between the first and second grid engagement members is generally equal to twice the center spacing between adjacent wires of the grid, and the third and fourth grid engagement members are disposed at a longitudinal location half way between the first and second ends of the base plate.

8. The anchor according to claim 5 wherein the fitting is secured to the base plate so as to be rotatable about an axis generally perpendicular to the base plate.

9. The anchor according to claim 5 wherein the fitting comprises first and second spaced apart ears and a pin extending between the ears.

10. A restraint anchor for securing an end of a vehicle tie-down member relative to a wire grid floor of a vehicle transport, the anchor comprising:

a base plate having first and second longitudinal ends, a lower surface for contacting the wire grid floor and an opposite upper surface;

a first pair of L-shaped grid engagement members integral with the first end of the base plate and projecting downwardly from the base plate and toward the second end of the base plate, the members of the first pair spaced laterally from one another by a distance permitting a longitudinally extending wire of the wire grid floor to pass therebetween;

a second pair of L-shaped grid engagement members integral with the second end of the base plate and projecting downwardly from the base plate and beyond the second end of the base plate, the members of the second pair spaced laterally from one another by a distance permitting a longitudinally extending wire of the wire grid floor to pass therebetween, the first and second pairs of members spaced from one another along a longitudinal axis of the base plate by distance generally equal to twice a center spacing between adjacent laterally extending wires of the wire grid floor;

a third of grid engagement members integral with respective first and second opposite lateral edges of the base plate, the members of the third pair extending downwardly from the base plate and toward the second end of the base plate at a location half way between the first and second pairs of grid engagement members; and a fitting disposed on the upper surface of the base plate for connection to the end of the tie-down member.

11. The anchor according to claim 10 wherein the fitting comprises first and second spaced apart ears and a pin extending between the ears.

12. The restraint assembly according to claim 10 wherein the fitting is rotatable about an axis generally perpendicular to the base plate.

* * * * *